United States Patent [19]

Havel

[11] Patent Number: 4,797,651

[45] Date of Patent: Jan. 10, 1989

[54] MULTICOLOR COMPARATOR OF DIGITAL SIGNALS

[76] Inventor: Karel Havel, P.O. Box 66, Station M, Toronto, Ontario, Canada, M6S 4T2

[21] Appl. No.: 866,929

[22] Filed: May 27, 1986

Related U.S. Application Data

[63] Continuation-in-part of Ser. No. 856,196, Apr. 28, 1986, abandoned.

[51] Int. Cl.[4] .................. G06F 7/04

[52] U.S. Cl. .................. 340/146.2

[58] Field of Search .................. 340/146.2; 364/713, 364/822; 350/356

[56] References Cited

U.S. PATENT DOCUMENTS

| | | | |
|---|---|---|---|
| 2,997,596 | 8/1961 | Vice | 250/209 |
| 3,875,456 | 4/1975 | Kano et al. | 313/501 |
| 3,889,233 | 6/1975 | Ogiwara | 340/146.2 X |
| 4,561,728 | 12/1985 | Kenan et al. | 350/356 |
| 4,604,707 | 8/1986 | Yamashita et al. | 364/822 |

*Primary Examiner*—David H. Malzahn

[57] ABSTRACT

An optical comparator for comparing two aligned sets of digital signals and for indicating the degree of similarity therebetween comprises a plurality of comparator cells each having two comparator inputs. Each comparator cell includes a multicolor light emitting diode adapted for emitting light of a first color when the first input is activated, light of a second color when the second input is activated, light of a composite color when both inputs are activated, and no light when no input is activated. Means are provided for absorbing light of the composite color whereby no light is emitted from a comparator cell in which the inputs are of equal activity. A light sensor is provided for monitoring total light output from a plurality of comparator cells. Light measured by the light sensor indicates the number of comparator cells having inputs of unequal activities and hence is representative of the degree of similarity between the two sets of signals.

19 Claims, 2 Drawing Sheets

MULTICOLOR COMPARATOR OF DIGITAL SIGNALS

CROSS-REFERENCE TO RELATED APPLICATIONS

This is a continuation-in-part of my copending application Ser. No. 06/856,196 filed Apr. 28, 1986, now abandoned, entitled Multicolor Optical Device.

BACKGROUND OF THE INVENTION

1. Field of the Invention

This invention generally relates to digital comparators and more specifically to optical comparators utilizing multicolor light emitting diodes.

2. Description of the Prior Art

A bistable device utilizing two electro-optical pairs connected in parallel is described in U.S. Pat. No. 2,997,596 issued on Aug. 22, 1961 to James F. Vize. Each pair includes serially connected monochromatic electroluminescent phosphor cell and photoconductor positioned in a radiation coupled relationship. The circuit exhibits two stable states and may be transferred to its other state by application of a light trigger signal.

A multicolor semiconductor lamp comprising a plurality of light emitting diodes for emitting light of respectively different colors is disclosed in U.S. Pat. No. 3,875,456 issued on Apr. 1, 1975 to Tsuyoshi Kano et al. The light emitting diodes are closely adjacent and covered by a layer of light scattering material to provide an appearance of a single light source.

Commercially well known digital comparator typically compares bit for bit two digital words and develops output digital signal indicating whether or not the two words are equal. The equality is usually determined by EXCLUSIVE-NOR circuits which individually compare equivalent bits in each word. If the compared digital words are not equal, the comparator is incapable of indicating the degree of similarity therebetween.

An optical comparator utilizing multicolor light emitting diodes for comparing digital signals is unknown.

SUMMARY OF THE INVENTION

Accordingly, it is the principal object of this invention to provide an improved digital comparator of extremely simple structure employing multicolor light emitting diodes.

It is another object of the invention to provide an optical comparator with memory.

It is further object of the invention to provide an optical comparator of two aligned sets of digital signals that is capable of indicating not only complete equality of the compared sets, but also a degree of similarity therebetween.

The invention resides in physical arrangement and electrical and optical coupling of a plurality of comparator cells, each including a multicolor light emitting diode for emitting either light signals of respectively different primary colors or a composite light signal. When the digital inputs of the comparator cell are unequal, the multicolor light emitting diode emits light of either primary color. When both digital inputs are inactive, the multicolor light emitting diode emits no light. When both digital inputs are active, the multicolor light emitting diode emits light of a composite color different from each primary color. A color filter is provided for absorbing light of the composite color whereby no light is emitted from the cell when both digital inputs are equal.

Further objects of the invention will become obvious from the accompanying drawings and their description.

BRIEF DESCRIPTION OF THE DRAWINGS

In the drawings in which are shown several possible embodiments of the invention.

Figure 1:
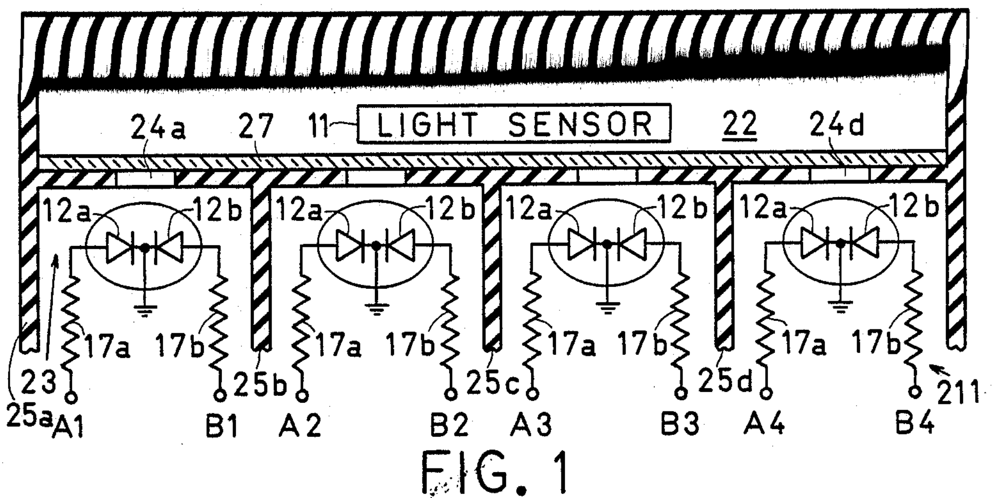
FIG. 1 is a schematic diagram illustrating inventive concepts of an optical comparator.

FIG. **9*a*** is a timing diagram showing the relationship of signals for writing red data to the selected comparator cell.

FIG. **9*b*** is a timing diagram showing the relationship of signals for writing red and green data to the selected comparator cell.

FIG. **9*c*** is a timing diagram showing the relationship of signals for writing green data to the selected comparator cell.

Throughout the drawings, like characters indicate like parts.

DESCRIPTION OF THE PREFERRED EMBODIMENTS

Referring now, more particularly, to the drawings, in FIG. is shown an optical comparator of this invention accommodated in a housing generally denoted by reference numeral 211 and comprising four comparator cells, each having two inputs A, B corresponding to respective comparator portions A, B and adapted for accepting digital signals. Respective comparator cells are disposed in optically isolated chambers 23 separated from one another by opaque walls 25. The chambers 23 communicate with sensor chamber 22 by respective apertures 24. A color filter 27, adapted to absorb light of composite color but transparent to light of each primary color, is disposed in the sensor chamber 22 to overlay all apertures 24.

Each comparator cell includes two light emitting diodes **12*a*, 12*b* positioned for directing light signals of respectively different primary colors through the aperture 24. Two voltage levels, referred to as logic high and low, respectively, are used throughout the description of the circuit. The operation of the optical comparator will be explained by considering all possible combinations of digital inputs. When low logic levels are applied to inputs A1, B1, no current flows in either light emitting diode branch, and both LEDs 12*a*, 12*b* are extinguished. Consequently, no light is transmitted through aperture 24*a* to sensor chamber 22. When a high logic level is applied to the input A2, and a low logic level is applied to the input B2, current flows from the input A2, via current limiting resistor 17*a*, which confines current flow, and LED 12*a* to ground; no current flows from the input B2. The LED 12***a* illuminates, and light of a first primary color is transmitted through the aperture and color filter 27 into sensor chamber 22. When a low logic level is applied to the input A3 and a high logic level to the input B3, current flows from the input B3, via resistor 17*b* and LED 12*b* to ground; no current flows from the input A3. The LED 12*b* illuminates, and light of a second primary color is transmitted through the aperture and color filter into the sensor chamber. When high logic level signals are applied to inputs A4, B4, current flows from the input A4, via resistor 17*a* and LED 12*a* to ground. Current also flows from the input B4, via resistor 17*b* and LED 12*b* to ground. As a consequence, both LEDs 12*a*, 12*b* illuminate in respective primary colors. As will be more specifically pointed out later, the light signals are blended to form a composite light signal of a composite color different from each primary color which is absorbed by color filter 27 and thus prevented from entering sensor chamber 22.

It is thus readily apparent that no light is emitted from the comparator cells in which the inputs are equal, either both low or both high, and light either of a first or second primary color is emitted from those comparator cells in which the inputs are unequal. When the compared sets of digital signals are equal bit by bit, there will be no light in the sensor chamber. When relatively few bits are unequal, there will be light of relatively low luminous intensity in the sensor chamber. Consequently, the total luminous intensity measured in the sensor chamber 22 by means of a light sensor 11 is indicative of the degree of similarity between the compared sets of digital signals.

The term 'light sensor' as used throughout the description of the invention is intended to be interpreted in a broad sense and may include photodiodes, phototransistors, photodarlingtons, phototriacs, photo sensitive silicon controlled rectifiers, photodetectors, photoresistors, photoconductive cells, and the like.

The color filter 27 may include commercially well known color absorbing filters which usually contain dye that absorbs a predetermined color, liquid crystal devices capable of absorbing specific colors, and the like.

Optical comparator of FIG. 1 has certain limitations. It will be recalled that digital logic levels are allowed to fluctuate within wide voltage limits. Such voltage fluctuations would result in corresponding fluctuations of LED currents which in turn, considering that luminous intensity of a LED is directly proportional to the LED current, would result in a deviation of the hue of composite light signal. This problem may be solved by adjusting values of the current limiting resistors to obtain the precise hue of composite light signal for a specific driver. However, the resistor values would have to be adjusted every time a different driver is used, which is not feasible.

Figure 2:
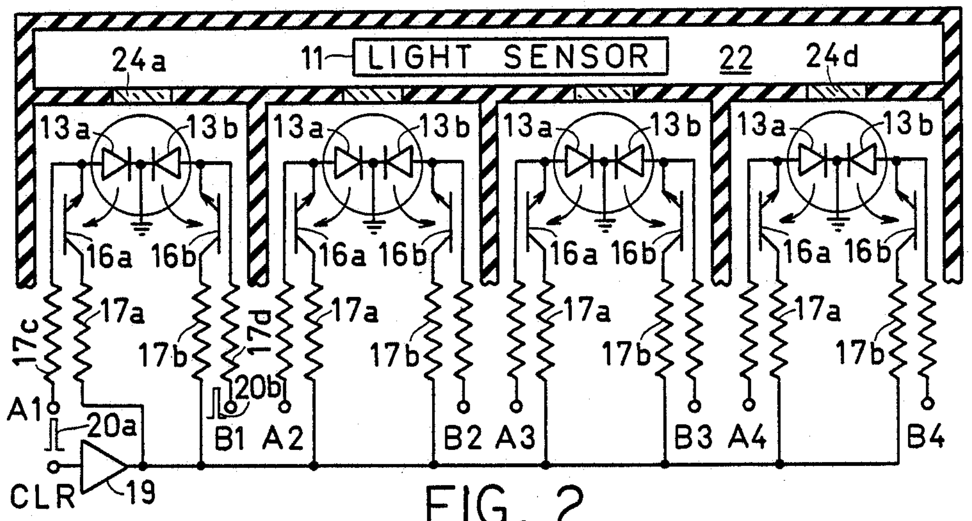
FIG. 2 is a schematic diagram of an optical comparator with memory.

The optical comparator shown in FIG. 2 solves such problems and is additionally capable of retaining the logic levels applied to its inputs. The storage may persist indefinitely, rendering the values available for immediate or later use. The device employs commercially well known phototransistors which exhibit very high resistance, typically hundreds of Megaohms, when maintained in dark and very low resistance, typically tens of Ohms, when illuminated. Each comparator cell includes two pairs of electrooptical components, red LED 13*a* and its associated phototransistor 16*a*, and green LED 13*b* and its associated phototransistor 16*b*. An optical feedback is established in each pair from the light emitting diode to the phototransistor to exert a toggle effect by varying resistance of the phototransistor in a sense tending to maintain the light emitting diode either in its illuminated condition or in its extinguished condition.

To reset the entire comparator, a low logic level is momentarily applied to its Clear input CLR. As a consequence, the output of a preferably TTL (Transistor Transistor Logic) buffer 19 also drops to a low logic level. Since a TTL device is not capable of sourcing current from a low logic level output, no current can flow therefrom to ground. The LEDs 13*a*, 13*b* in all cells therefore extinguish, and the resistances of phototransistors 16*a*, 16*b* in all cells rise to very high values. When a high logic level returns to the input CLR, the output of buffer 19 also rises to a high logic level. However, considering the first cell as an example, the currents flowing via resistor 17*a* high resistance of phototransistor 16*a* and LED 13*a* to ground, and in parallel, via resistor 17*b*, high resistance of phototransistor 16*b* and LED 13*b* to ground, are very small and not sufficient to illuminate the LEDs. This state is therefore stable and will exist until either of or both inputs A1, B1 are activated.

To store a high logic level in the A portion of the first comparator cell, a relatively narrow positive going pulse 20*a* is applied to its input A1. The width of the pulse depends on the response time of the phototransistor and should be sufficient to allow its resistance to drop below a predetermined triggering point. As a consequence, current flows from the input A1, via resistor 17*c* and LED 13*a* to ground. The red LED 13*a* illuminates, and its emission causes the resistance of its associated phototransistor 16*a* to rapidly drop to a very low value. As a result of a positive optical feedback, whereby the increase in luminance of the LED causes the decrease in the resistance of the phototransistor which in turn has an effect of further increase in the luminance and further decrease in the resistance, the current in the red LED branch, from buffer 19, via resistor 17*a* and phototransistor 16*a*, sharply rises to a value sufficient to maintain the LED fully illuminated. At the conclusion of the pulse 20*a*, the magnitude of the LED current is limited substantially by the value of the current limiting resistor 17*a*. It is readily apparent that this state is stable and will exist until another input of the device is activated.

To store a high logic level in the B portion of the first comparator cell, a positive going pulse 20*b* is applied to its input B1. As a consequence, current flows from the input B1, via resistor 17*d* and LED 13*b* to ground. The green LED 13*b* illuminates, and its emission causes the resistance of its associated phototransistor 16*b* to drop to a very low value. The current in the green LED branch, from buffer 19, via resistor 17*b* and phototransistor 16*b*, sharply rises to a value sufficient to maintain the LED illuminated.

To store high logic levels in both A and B portions of the first comparator cell, both pulses 20*a*, 20*b* are applied, either simultaneously or sequentially, to respective inputs A1 and B1. As a consequence, currents flow from the input A1, via current limiting resistor 17*c* and LED 13*a* to ground and from the input B1, via current limiting resistor 17*d* and LED 13*b* to ground. Both red LED 13*a* and green LED 13*b* illuminate, and their emissions respectively cause the resistances of associated phototransistors 16*a*, 16*b* to drop to very low values. The currents in the red LED and green LED branches sharply rise to values sufficient to maintain both LEDs illuminated. The red and green light signals are blended to form a composite light signal of substantially yellow color. The hue of composite light signal may be precisely adjusted by varying the values of respective current limiting resistors 17*a*, 17*b*.

When the output of buffer 19 is at a high logic level, the specific voltage therein may be within a wide voltage range. However, the voltage is the same for all LED branches connected thereto. Thus the accuracy of the ratio of currents in the LED branch pairs in each comparator cell and resulting accuracy of the hue of composite light depend only on the matching of the current limiting resistors in each pair.

Figure 3:
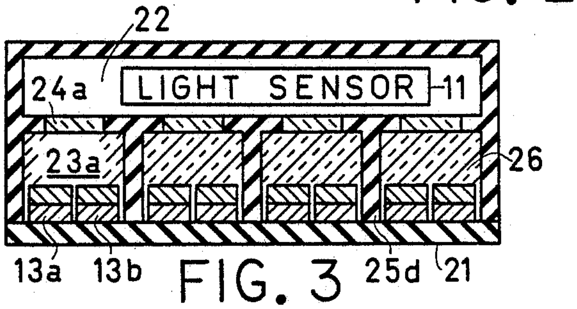
FIG. 3 is a cross-sectional view revealing internal structure of an optical comparator.

An important consideration has been given to physical arrangement of light emitting diodes in respective comparator cells, as illustrated in FIG. 3. The pairs of LEDs 13*a*, 13*b*, adapted for emitting light of red and green colors, respectively, are disposed in respective chambers 23 which are optically separated from one another by opaque walls 25. In each chamber, the LEDs 13*a*, 13*b* are mounted on a suitable support 21 and completely surrounded by light scattering material 26. When only one LED in the pair is energized, by means of a circuit shown in FIG. 1, it emits light through a color filter aperture 24*a* into the sensor chamber 22. When both LEDs are energized, light signals of red and green primary colors are blended, by passing through light scattering material 26, to form a composite light signal of substantially yellow color, which is absorbed by the aperture color filter 24*a* and thereby prevented from entering the sensor chamber 22. The color filter may have characteristics of a commercially well known blue color filter.

Figure 4:
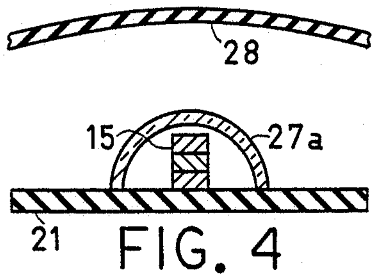
FIG. 4 is a cross-sectional view showing the detail of a light sensor.

FIG. 4 is a detail of an exemplary light sensor which includes a phototransistor 15 mounted on a suitable support 21 and a mirror 28 disposed adjacent. The mirror may be of a parabolic, spherical or other suitable shape for reflecting light beams emerging from apertures of all comparator cells and for directing the beams on the active surface of the phototransistor. An attenuating filter 27*a* is disposed closely adjacent and completely surrounds the phototransistor. The attenuating filter serves to attenuate light directed on the phototransistor, by partially absorbing light, so as to prevent the phototransistor from achieving saturation. The attenuating filter may be commercially well known neutral density gray type which has nearly constant transmission across the visible spectrum.

Figure 5:
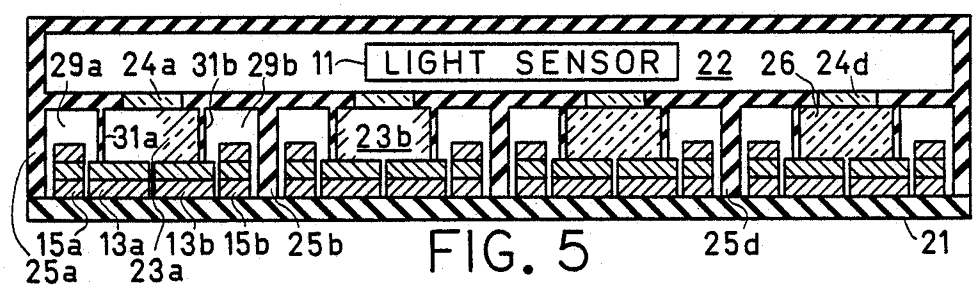
FIG. 5 is a cross-sectional view revealing internal structure of an optical comparator with memory.

The optical comparator illustrated in FIG. 5 includes four comparator cells disposed in chambers separated by respective walls 25. Each comparator cell includes two pairs of associated closely adjacent light emitting diodes and phototransistors 13*a* and 15*a*, 13*b* and 15*b* electrically coupled as in FIG. 2. The light emitting diodes are adapted for emitting light signals of respectively different primary colors upon activation. In the small chamber 29*a*, phototransistor 15*a* is completely surrounded by the chamber walls, but its associated light emitting diode 13a is only partially disposed therein, being partially overlayed by opaque chamber wall 31*a* such that its one portion is located within small chamber 29*a*, and its remaining portion is located within the chamber 23*a*. The vertically extending portion of the chamber wall 31*a* abuts the light emitting diode and provides a hermetic seal therebetween so as to secure small chamber 29*a* from the presence of ambient light. The active area of the phototransistor is oriented to intercept light signals emitted from the portion of the light emitting diode within the chamber to exert a toggle effect by varying resistance of the phototransistor in a sense tending to maintain the light emitting diode either in its illuminated condition or in its extinguished condition. The other phototransistor 15*b* is similarly completely disposed in small chamber 29*b*, and its associated light emitting diode 13*b* is partially disposed therein and partially disposed in the chamber 23*a*. The light signals emitted from the portions of the light emitting diodes that are located in the chamber 23*a* are blended by passing through transparent light scattering material 26 to form a composite light signal. A color filter aperture 24*a* is formed in the chamber 23*a* such that light beams emitted by light emitting diodes 13*a* or 13*b* can pass into the sensor chamber 22. As explained previously, the filter aperture will pass light of any primary color, but will absorb light of the composite color and prevent it from entering the sensor chamber.

Figure 6:
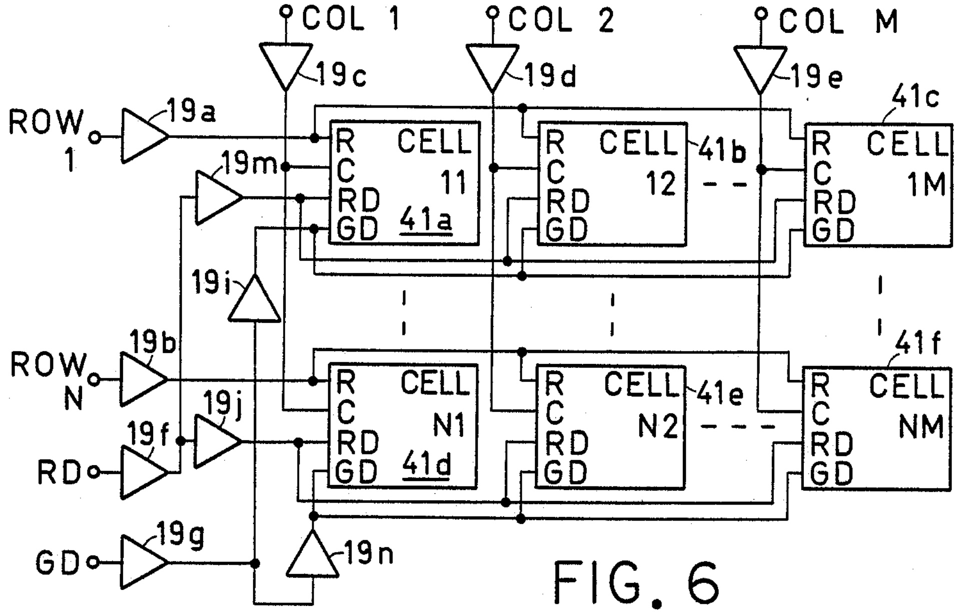
FIG. 6 is a block diagram of a matrix of comparator cells arranged in rows and columns.

It should be emphasized that there is no limit upon the number of comparator cells employed in the optical comparator of the invention. When employing large numbers of comparator cells, it may be convenient to arrange them systematically in a matrix of rows and columns, as illustrated in FIG. 6. A particular comparator cell may be thus conveniently identified by its row and column numbers, e. g., cell 12, shown at 41*b*, is located at row 1 and column 2. To facilitate addressing of the cells, each cell has a Row input R, Column input C, Red Data input RD, and Green Data input GD, all adapted for accepting digital signals. It is clearly evident from FIG. 6 that the Row inputs R of all comparator cells located in the same row are coupled. Similarly, the Column inputs C of all comparator cells located in the same column are coupled. The Red Data inputs RD of all comparator cells in the matrix are coupled. In a similar fashion, the Green Data inputs GD of all comparator cells are coupled.

All comparator cells may be reset to low logic levels by application of a suitable reset pulse, as explained in FIG. 2. To write a high logic level to a desired portion of a desired comparator cell, it is necessary to simultaneously activate the row input in which the cell is located, column input in which the cell is located, and either of, or both, inputs RD, GD.

Figure 9A:
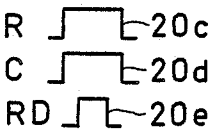
Figure 9B:
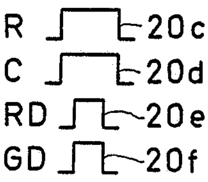
Figure 9C:
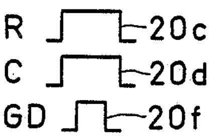
Figure 7:
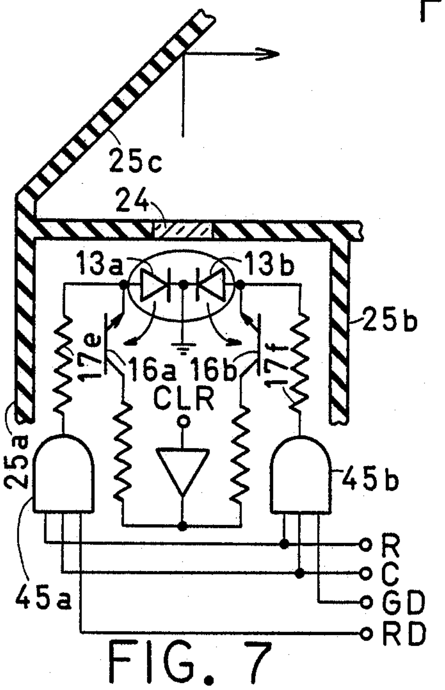
FIG. 7 is a schematic diagram showing the detail of one comparator cell of FIG. 6.

Proceeding now to the detailed description, in FIG. 7 is shown a detail of one comparator cell of the matrix of FIG. 6. The cell is similar to that shown in FIG. 2 and additionally includes AND gates 45*a*, 45*b* for gating signals R, C, RD, and GD. The operation of the cell will be explained on examples of writing a high logic level to either of or both its portions. Assuming that the cell is located at the intersection of the row 1 and column 2 in FIG. 6 and by referring additionally to FIG. 9*a*, to write a high logic level to Red Data portion of the comparator cell 12, a positive going pulse 20*c* is applied to the input ROW 1, to activate via buffer 19*a* all Row inputs in the row 1, positive going pulse 20*d* is applied to the input COL 2, to activate via buffer 19*d* all Column inputs in the column 2, and positive going pulse 20*e* is applied to the input RD, to activate via buffers 19*f*, 19*m*, etc., RD inputs of all cells. As a consequence, the output of AND gate 45*a* in the cell 12 rises momentarily to a high logic level, and current flows therefrom via resistor 17*e* and LED 13*a* to ground. The LED 13*a* illuminates and is maintained by optical feedback in its illuminated condition, as explained in FIG. 2. Similarly, to write a high logic level to Green Data portion of the comparator cell 12, with reference to FIG. 9*c*, pulse 20*c* is applied to the input ROW 1, pulse 20*d* is applied to the input COL 2, and pulse 20*f* is applied to the input GD. As a consequence, the output of AND gate 45*b* in the cell 12 rises momentarily to a high logic level, and current flows therefrom via resistor 17*f* and LED 13*b* to ground, thereby causing the LED to illuminate. To write high logic levels to both Red Data and Green Data portions, with reference to FIG. 9*b*, pulse 20*c* is applied to the input ROW 1, pulse 20*d* is applied to the input COL 2, pulse 20*e* is applied to the input RD and pulse 20*f* is applied to the input GD. As a consequence, the output of AND gate 45*a* in the cell 12 rises to a high logic level, and so does the output of AND gate 45*b* therein. Current flows from the output of AND gate 45*a* to illuminate LED 13*a*, and, in a like manner, from the output of AND gate 45*b* to illuminate LED 13*b*.

When either portion of the cell is in its illuminated condition, light beam, either of red or green color, passes through color filter aperture 24, reflects from internally smooth surface of inclined wall 25*c*, and is directed to the light sensor, as will be more fully discussed below. When both portions of the cell are in their illuminated conditions, light signals of red and green colors are blended to form a composite light signal of substantially yellow color, which is absorbed by color filter aperture 24 and prevented from being transmitted out of the cell.

Figure 8:
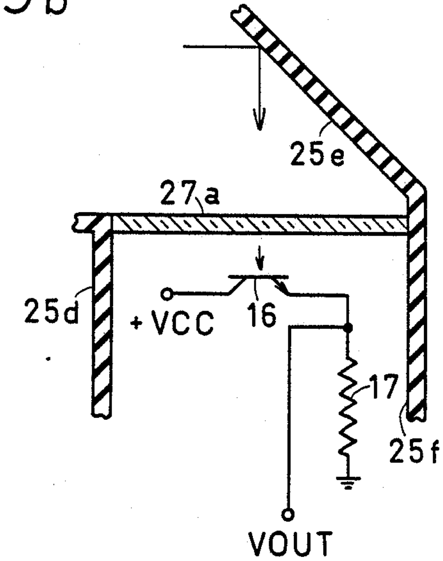
FIG. 8 is a schematic diagram showing the detail of a light sensor.

In FIG. 8 is shown a schematic diagram of the light sensor circuit which is disposed in a sensor chamber located laterally with respect to the comparator cells. The circuit employs commercially well known phototransistor 16, of a spectral response allowing it to respond to the range of primary colors, serially coupled with a resistor 17 of suitable value. Positive voltage +VCC is applied to the collector of the phototransistor to operatively bias same. Light beams from all comparator cells are reflected from smooth surface of inclined wall 25*e* and directed through attenuating filter 27*a*, which passes only a predetermined portion of total light, on the active surface of phototransistor 16. As mentioned previously, the resistance of the phototransistor is variable with illumination. When it is substantially dark in the sensor chamber, which indicates that all comparator cells detected equality at their inputs, the phototransistor exhibits very high resistance, and, as a consequence, there is very small current flowing from the voltage source +VCC, via phototransistor 16 and resistor 17 to ground, generating very small voltage VOUT. When there is relatively small luminous intensity in the sensor chamber, which indicates that only relatively few comparator cells detected unequality at their inputs, the phototransistor exhibits slightly smaller resistance and, as a result, the current in the phototransistor circuit slightly rises, and so does the voltage VOUT. When there is relatively large luminous intensity in the sensor chamber, which indicates that relatively large numbers of comparator cells detected unequality at their inputs, the resistance of the phototransistor significantly drops. As a consequence, current in the circuit significantly rises, and so does the voltage VOUT. It is thus readily apparent that the voltage VOUT may serve as an indication of the degree of similarity between the compared sets of digital signals. Very small value of VOUT indicates that the two sets are either equal or very similar. Relatively small value of VOUT indicates that the two sets are still similar. Relatively large value of VOUT indicates that the two sets are not similar. It would be obvious to those skilled in the art, in the view of this disclosure, that the values of resistor 17 and attenuation factor of filter 27*a* may be selected to allow phototransistor 16 to operate in the linear region of its characteristic without achieving saturation.

The invention may be now briefly summarized. The method was disclosed of comparing a first and second input signals, each having either a first or second level, comprising the steps of developing a light signal of a first color for the first input signal having a first level, developing a light signal of a second color for the second input signal having a first level, developing no light signal for an input signal having a second level whereby there is no light signal when both input signals are of a second level, developing a light signal of a third color when both input signals are of a first level, removing the light signal of the third color, if any, whereby there is no light signal when both input signals are of a first level, and interrogating whether there is a light signal to determine whether the input signals are of same level.

A comparator of two aligned sets of digital signals, capable of indicating the degree of similarity therebetween, was disclosed that comprises a plurality of comparator cells respectively disposed in optically isolated chambers. Each cell includes a pair of light emitting diodes adapted for emitting light of respectively different primary colors when activated by signals at respective cell inputs. Means are provided for combining light of primary colors in each cell to form light of a composite color. Color filter is further provided in each cell for removing light of composite color only, but for passing light of respective primary colors. When both cell inputs are inactive, there is no light emitted from the cell. When both cell inputs are active, both light emitting diodes are activated to produce light of a composite color which is absorbed by the color filter, and no light is emitted from the cell. Light of either primary color is emitted from the cell only when the cell inputs are unequal. Light sensor means are provided for interrogating the value of total luminous intensity from all comparator cells which is a function of the number of unequal comparator inputs and hence is representative of the degree of similarity between the two sets of signals.

All matter herein described and illustrated in the accompanying drawings should be interpreted as illustrative and not in a limiting sense. It would be obvious that numerous modifications can be made in the construction of the preferred embodiments shown herein, without departing from the spirit of the invention as defined in the appended claims.

CORRELATION TABLE

This is a correlation table of reference characters used in the drawings herein, their descriptions, and examples of commercially available parts.

| # | DESCRIPTION | EXAMPLE |
|---|---|---|
| 11 | light sensor | |
| 12a | light emitting diode of first color | |
| 12b | light emitting diode of second color | |
| 13a | red light emitting diode | |
| 13b | green light emitting diode | |
| 15 | phototransistor | |
| 16 | Motorola phototransistor | MRD310 |

-continued

| # | DESCRIPTION | EXAMPLE |
|---|---|---|
| 17 | resistor | |
| 19 | buffer | 74LS244 |
| 20 | pulse | |
| 21 | support | |
| 22 | sensor chamber | |
| 23 | chamber for light emitting diodes | |
| 24 | color filter aperture | |
| 25 | opaque wall | |
| 26 | light scattering material | |
| 27 | color absorbing filter | |
| 27a | attenuating filter | |
| 28 | curved reflecting surface | |
| 29 | small chamber | |
| 31 | opaque chamber wall | |
| 41 | one comparator cell in a matrix | |
| 45 | 3-input AND gate | 74LS11 |
| 211 | housing | |

What I claim is:

1. A method of comparing a first signal and a second signal, each said signal having either a first level or a second level, comprising the steps of:

developing light of a first color when only said first signal has a first level;

developing light of a second color when only said second signal has a first level;

developing light of a third color when both said first signal and said second signal have a first level;

developing no light when both said first signal and said second signal have a second level;

filtering light to obtain filtered light by removing light of said third color and by transmitting light of said first color or of said second color; and interrogating said filtered light to determined whether said first signal and said second signal have the same level or different levels.

2. The method od comprising as defined in claim 1 wherein light of said third color is obtained by blending light of said first color and light of said second color.

3. A method of comparing a first signal and a second signal, each said signal having either a first level or a second level, comprising the steps of:

causing a first light emitting diode to emit light of a first color when said first signal has a first level and to extinguish when said first signal has a second level;

causing a second light emitting diode to emit light of a second color when said second signal has a first level and to extinguish when said second signal has a second level;

blending, when both said first light emitting diode and said second light emitting diode emit light, their emissions to obtain composite light of a composite color;

filtering light emitted by said first light emitting diode and said second light emitting diode to obtain filtered light by removing light of said composite color and by transmitting light of said first color or of said second color; and interrogating said filtered light to determine whether said first signal and said second signal have the same level or different levels.

4. A multicolor comparator of a pair of signals, each said signal having either a first level or a second level, comprising:

a first input terminal and a second input terminal for receiving said signals;

a multicolor light source including a first light source for emitting upon activation light of a first color, a second light source for emitting upon activation light of a second color, and means for combining light emitted from said first light source and said second light source to obtain composite light of a composite color;

said first light source being coupled to said first input terminal for being activated in response to signals of a first level and for not being activated in response to signals of a second level;

said second light source being coupled to said second input terminal for being activated in response to signals of a first level and for not being activated in response to signals of a second level;

whereby no light is emitted from said multicolor light source when signals of a second level are applied to said first input terminal and to said second input terminal, light of said composite color is emitted from said multicolor light source when signals of a first level are applied to said first input terminal and to said second input, and light either of said first color or of said second color is emitted from said multicolor light source when a signal of a first level is applied to one of said input terminals, and a signal of a second level is applied to the other of said input terminals;

filter means disposed adjacent to said multicolor light source for filtering light emitted therefrom to obtain filtered light by removing light of said composite color and by transmitting light either of said first color or of said second color; and means for interrogating said filtered light to determine whether the signals in said pair have the same level or different levels.

5. A multicolor comparator of signals as defined in claim 4 wherein said filter means include a color filter for absorbing light of said composite color and for transmitting light either of said first color or of said second color.

6. A multicolor comparator of a pair of signals, each said signal having either a first level or a second level, comprising:

a first input terminal and a second input terminal for receiving said signals;

a multicolor light source including a first light emitting diode for emitting when forwardly biased light of a first color, a second light emitting diode for emitting when forwardly biased light of a second color, and means for combining light emitted by said first light emitting diode and by said second light emitting diode to obtain composite light of a composite color;

said first light emitting diode being coupled to said first input terminal for being forwardly biased in response to signals of a first level and for not being forwardly biased in response to signals of a second level;

said second light emitting diode being coupled to said second input terminal for being forwardly biased in response to signals of a first level and for not being forwardly biased in response to signals of a second level;

whereby no light is emitted from said multicolor light source when signals of a second level are applied to said first input terminal and to said second input terminal, light of said composite color is emitted from said multicolor light source when signals of a first level are applied to said first input terminal and to said second input terminal, and light either of said first color or of said second color is emitted from said multicolor light source when a signal of a first level is applied to one of said input terminals, and a signal of a second level is applied to the other of said input terminals;

color filter means disposed adjacent to said multicolor light source for filtering light emitted therefrom to obtain filtered light by absorbing light of said composite color and by transmitting light either of said first color or of said second color; and means for measuring the intensity of said filtered light to determine whether the signals in said pair have the same level or different levels.

7. A multicolor comparator of two aligned sets of pairs of signals, each said signal having either a first level or a second level, comprising:

A. a plurality of comparator cells, each said cell including:
   a. a first input and a second input for receiving a pair of said signals from respective said sets;
   b. a multicolor light source including a first light source for emitting upon activation light of a first color, a second light source for emitting upon activation light of a second color, and means for combining light emitted from said first light source and from said second light source to obtain composite light of a composite color;
   c. said first light source being coupled to said first input terminal for being activated in response to signals of a first level and for not being activated in response to signals of a second level;
   d. said second light source being coupled to said second input terminal for being activated in response to signals of a first level and for not being activated in response to signals of a second level;
   e. whereby no light is emitted from said multicolor light source when signals of a second level are applied to said first input terminal and to said second input terminal, light of said composite color is emitted from said multicolor light source when signals of a first level are applied to said first input terminal and to said second input terminal, and light either of said first color or of said second color is emitted from said multicolor light source when a signal of a first level is applied to one of said input terminals, and a signal of a second level is applied to the other of said input terminals;

B. filter means disposed adjacent to a plurality of said cells for filtering light emitted therefrom to obtain filtered light by removing light of said composite color and by transmitting light either of said first color or of said second color; and C. means for interrogating said filtered light to determine whether the signals in a plurality of said pairs have the same level or different levels.

8. A multicolor comparator of two aligned sets of pairs of signals, each said signal having either a first level or a second level, comprising:

A. a plurality of comparator cells arranged in a matrix of rows and columns, each said cell including:
   a. a row input terminal, a column input terminal, a first data input terminal, and a second data input terminal for receiving said signals;
   b. a multicolor light source including a first light source for emitting upon activation light of a first color, a second light source for emitting upon activation light of a second color, and means for combining light emitted by said first light source and by said second light source to obtain composite light of a composite color;
   c. said first light source being coupled to the first data input terminal for being activated in response to signals of a first level and for not being activated in response to signals of a second level;
   d. said second light source being coupled to the second data input terminal for being activated in response to signals of a first level and for not being activated in response to signals of a second level;
   e. whereby no light is emitted from said multicolor light source when signals of a second level are applied to the first data input terminal and to the second data input terminal, light of said composite color is emitted from said multicolor light source when signals of a first level are applied to the first data input terminal and to the second data input terminal, and light either of said first color or of said second color is emitted from said multicolor light source when a signal of a first level is applied to one of the data input terminals, and a signal of a second level is applied to the other of the data input terminals;

B. the row input terminals, the column input terminals, the first data input terminals, and the second data input terminals of said cells in said matrix being coupled according to a predetermined system such that said signals may be selectively applied to said cells;

C. filter means disposed adjacent to said matrix for filtering light emitted from a plurality of said cells to obtain filtered light by removing light of said composite color and by transmitting light either of said first color or of said second color; and D. means for interrogating said filtered light to determine whether the signals in a plurality of said pairs have the same level or different levels.

9. A multicolor comparator as defined in claim 8 wherein the row input terminals of all cells located in the same row are coupled, the column input terminals of all cells located in the same column are coupled, the first data input terminals of all cells in said matrix are coupled, and the second data input terminals of all cells in said matrix are coupled.

10. A multicolor comparator as defined in claim 8 wherein:

the row input terminals of all cells located in the same row are coupled, the column input terminals of all cells located in the same column are coupled, the first data input terminals of all cells in said matrix are coupled, and the second data input terminals of all cells in said matrix are coupled; and gate means are provided for gating signals applied to the row inputs and to the column input terminals such that the signals applied to the coupled first data input terminals and to the coupled second data input terminals may be applied to the first data input terminal and the second data input terminal in a selective one of said cells.

11. A multicolor comparator as defined in claim 8 wherein:

said first light source emits upon activation light of red color;

said second light source emits upon activation light of green color;

the first data input terminal of said cell is operative in response to said signal of a first level to activate said first light source to emit light of red color; and the second data input terminal of said cell is operative in response to said signal of a first level to activate said second light source to emit light of green color.

12. A multicolor comparator of a pair of signals, each said signal having either a first level or a second level, comprising:

a first input terminal and a second input terminal for receiving said signals;

a multicolor light source including a first light source capable either of an extinguished condition or of an illuminated condition in a first color, a second light source capable either of an extinguished condition or of an illuminated condition in a second color, and means for combining light emitted by said first light source and said second light source to obtain composite light of a composite color;

said first light source being coupled to said first input terminal for being briefly illuminated in response to briefly applied signals of a first level and for not being illuminted in response to signals of a second level;

means coupled to said first light source for stabilizing it in its illuminated condition when briefly illuminated;

said second light source being coupled to said second input terminal for being briefly illuminated in response to briefly applied signals of a first level and for not being illuminated in response to signals of a second level;

means coupled to said second light source for stabilizing it in its illuminated condition when briefly illuminated;

whereby no light is emitted from said multicolor light source when signals of a second level are applied to said first input terminal and to said second input terminal, light of said composite color is emitted from said multicolor light source when signals of a first level are briefly applied to said first input terminal and to said second input terminal, and light either of said first color or of said second color is emitted from said multicolor light source when a signal of a first level is briefly applied to one of said input terminals, and a signal of a second level is applied to the other of said input terminals;

filter means disposed adjacent to said multicolor light source for filtering light emitted therefrom to obtain filtered light by removing light of said composite color and by transmitting light either of said first color or of said second color; and means for interrogating said filtered light to determine whether the signals in said pair, which were briefly applied to said first input and to said second input, had the same level or different levels.

13. A multicolor comparator as defined in claim 12 further including initialization means having reset outputs respectively coupled to said first light source and to said second light source and having a reset input terminal responsive to a reset signal, for activating said reset outputs to extinguish said first light source and said second light source when said reset signal is applied to said reset input terminal.

14. A multicolor comparator of two aligned sets of pairs of signals, each said signal having either a first level or a second level, comprising:

A. a plurality of comparator cells, each said cell including:

a. a first input terminal and a second input terminal for receiving a pair of said signals from respective said sets;

b. a multicolor light source including a first light source for emitting when activated light of a first color, a second light source for emitting when activated light of a second color, and means for combining light emitted by said first light source and by said second light source to obtain composite light of a composite color;

c. said first light source being coupled to said first input terminal for being briefly illuminated in response to briefly applied signals of a first level and for not being illuminated in response to signals of a second level;

d. said second light source being coupled to said second input terminal for being briefly illuminated in response to briefly applied signals of a first level and for not being illuminated in response to signals of a second level;

e. memory means coupled to said first light source and to said second light source for respectively stabilizing them in their illuminated conditions when briefly illuminated;

f. whereby no light is emitted from said multicolor light source when signals of a second level are applied to said first input terminal and to said second input terminal, light of said composite color is emitted from said multicolor light source when signals of a first level are briefly applied to said first input terminal and to said second input terminal, and light either of said first color or of said second color is emitted from said multicolor light source when a signal of a first level is briefly applied to one of said input terminals, and a signal of a second level is applied to the other of said input terminals;

B. filter means disposed adjacent to a plurality of said cells for filtering light emitted therefrom to obtain filtered light by removing light of said composite color and by transmitting light either of said first color or of said second color; and C. means for measuring luminous intensity of said filtered light to determine whether the signals in a plurality of said pairs, which were briefly applied to said first inputs and to said second inputs, had the same level or different levels.

15. A multicolor comparator as defined in claim 14 further including initialization means having reset outputs coupled to all said first light sources and to all said second light sources and having a reset input terminal responsive to a reset signal, for activating said reset outputs to extinguish all said first light sources and all said second light sources when said reset signal is applied to said reset input terminal.

16. A multicolor comparator for determining the degree of similarity between two aligned sets of pairs of signals, each said signal having either a first level or a second level, comprising:

A. a plurality of comparator cells, each said cell including:

a. a first input terminal and a second input for receiving a pair of said signals from respective said sets;

b. a multicolor light source including a first light source for emitting when activated light of a first color, a second light source for emitting when activated light of a second color, and means for combining light emitted by said first light source and by said second light source to obtain composite light of a composite color;

c. said first light source being coupled to said first input terminal for being activated in response to signals of a first level and for not being activated in response to signals of a second level;

d. said second light source being coupled to said second input terminals for being activated in response to signals of a first level and for not being activated in response to signals of a second level;

e. whereby no light is emitted from said multicolor light source when signals of a second level are applied to said first input terminal and to said second input terminal, light of said composite color is emitted from said multicolor light source when signals of a first level are applied to said first input terminal and to said second input terminal, and light either of said first color or of said second color is emitted from said multicolor light source when a signal of a first level is applied to one of said input terminals, and a signal of a second level is applied to the other of said input terminals;

B. filter means disposed adjacent to a plurality of said cells for filtering light emitted therefrom to obtain filtered light by removing light of said composite color and by transmitting light either of said first color or of said second color; and C. means for measuring total luminous intensity of said filtered light, which is a function of the number of said cells having pairs of said signals of unequal levels applied to their inputs, to thereby determine the degree of similarity between said two sets of pairs of signals.

17. A multicolor comparator as defined in claim 16 wherein said means for measuring total luminous intensity of said filtered light include a phototransistor and means for directing said filtered light on of said phototransistor, said phototransistor being further operatively biased for developing an output voltage which serves as an indication of the degree of similarity between said two sets of signals.

18. A multicolor comparator as defined in claim 16 wherein:

said means for measuring total luminous intensity of said filtered light include a phototransistor and means for directing said filtered light on said phototransistor, said phototransistor being further operatively biased for developing an output voltage which serves as an indication of the degree of similarity between said two sets of signals; and attenuating filter means disposed adjacent to said phototransistor for absorbing a predetermined portion of light directed on said phototransistor so as to prevent it from achieving saturation.

19. A multicolor comparator for determining the degree of similarity between two aligned sets of pairs of signals, each said signal having either a first level or a second level, comprising:

A. a plurality of comparator cells, each said cell including:

a. a first input terminal and a second input terminal for receiving a pair of said signals from respective said sets;

b. a multicolor light source including a first light emitting diode for emitting when forwardly biased light of a first color, a second light emitting diode for emitting when forwardly biased light of a second color, and means for combining light emitted by said first light emitting diode and said second light emitting diode to obtain composite light of a composite color;

c. said first light emitting diode being coupled to said first input terminal for being forwardly biased in response to signals of a first level and for not being forwardly biased in response to signals of a second level;

d. said second light emitting diode being coupled to said second input terminal for being forwardly biased in response to signals of a first level and for not being forwardly biased in response to signals of a second level;

e. whereby no light is emitted from said multicolor light source when signals of a second level are applied to said first input terminal and to said second input terminal, light of said composite color is emitted from said multicolor light source when signals of a first level are applied to said first input terminal and to said second input terminal, and light either of said first color or of said second color is emitted from said multicolor light source when a signal of a first level is applied to one of said input terminals, and a signal of a second level is applied to the other of said input terminals;

B. color filter means disposed adjacent to a plurality of said cells for filtering light emitted therefrom to obtain filtered light by absorbing light of said composite color and by transmitting light either of said first color or of said second color; and C. a phototransistor disposed adjacent to said cells for measuring total luminous intensity of said filtered light, which is a function of the number of said cells having pairs of said signals of unequal levels applied to their inputs, said phototransistor being operatively biased for developing an output voltage which serves as an indication of the degree of similarity between said two sets of pairs of signals.

* * * * *